(12) United States Patent
Gurinavičiūtė et al.

(10) Patent No.: US 12,039,442 B2
(45) Date of Patent: *Jul. 16, 2024

(54) SYSTEMS AND METHOD FOR CATEGORIZING DOMAINS USING ARTIFICIAL INTELLIGENCE

(71) Applicant: UAB 360 IT, Vilnius (LT)

(72) Inventors: Juta Gurinavičiūtė, Vilnius (LT); Carlos Eliseo Salas Lumbreras, Vilnius (LT)

(73) Assignee: UAB 360 IT, Vilnius (LT)

( * ) Notice: Subject to any disclaimer, the term of this patent is extended or adjusted under 35 U.S.C. 154(b) by 3 days.

This patent is subject to a terminal disclaimer.

(21) Appl. No.: 17/846,514

(22) Filed: Jun. 22, 2022

(65) Prior Publication Data

US 2023/0409900 A1   Dec. 21, 2023

Related U.S. Application Data

(63) Continuation of application No. 17/845,249, filed on Jun. 21, 2022.

(51) Int. Cl.
  *G06N 3/08* (2023.01)
  *G06F 16/951* (2019.01)
  *G06F 16/958* (2019.01)

(52) U.S. Cl.
  CPC .............. *G06N 3/08* (2013.01); *G06F 16/951* (2019.01); *G06F 16/958* (2019.01)

(58) Field of Classification Search
  None
  See application file for complete search history.

(56) References Cited

U.S. PATENT DOCUMENTS

| 8,886,799 B1* | 11/2014 | Zhang | G06Q 30/0241 709/224 |
| 2007/0124701 A1* | 5/2007 | Gong | G06F 16/954 715/777 |
| 2013/0132366 A1* | 5/2013 | Pieper | G06F 16/954 707/710 |

(Continued)

OTHER PUBLICATIONS

Office Action issued in co-pending U.S. Appl. No. 17/845,249, dated Oct. 6, 2022.

(Continued)

*Primary Examiner* — Kris E Mackes
*Assistant Examiner* — Soheila (Gina) Davanlou
(74) *Attorney, Agent, or Firm* — Meunier Carlin & Curfman LLC

(57) ABSTRACT

In an embodiment, a set of labeled training data that includes indicators of webpages is received. Each indicated webpage is labeled with one or more categories that were determined for the webpage by a human reviewer. Features, such as text and scripts, are extracted from each indicated webpage, and are used along with the labels to train a classifier to predict one or more categories for a webpage based on the features of the webpage. The trained classifier may be used to associate one or more categories with each domain of a plurality of domains given the categories predicted for some or all of the webpages associated with the domain. A list of domains and associated categories may be used for a variety of purposes including search engine optimization and content filtering.

14 Claims, 8 Drawing Sheets

(56) References Cited

U.S. PATENT DOCUMENTS

| | | | | |
|---|---|---|---|---|
| 2018/0218241 | A1* | 8/2018 | Liang | G06F 18/24 |
| 2019/0014133 | A1* | 1/2019 | David | H04L 67/02 |
| 2019/0102402 | A1* | 4/2019 | Perron | H04L 51/214 |
| 2019/0294642 | A1 | 9/2019 | Matlick et al. | |
| 2020/0092257 | A1* | 3/2020 | Goldstein | H04L 67/02 |
| 2021/0232478 | A1 | 7/2021 | My et al. | |
| 2021/0314352 | A1* | 10/2021 | Yadav | H04L 63/1483 |
| 2021/0406255 | A1* | 12/2021 | Raghuramu | H04L 63/0263 |
| 2022/0253502 | A1* | 8/2022 | Alonichau | G06F 16/9538 |

OTHER PUBLICATIONS

Office Action issued in co-pending U.S. Appl. No. 17/845,249, dated Feb. 1, 2023.
Office Action issued in co-pending U.S. Appl. No. 17/845,249, dated Aug. 9, 2023.

\* cited by examiner

SYSTEMS AND METHOD FOR CATEGORIZING DOMAINS USING ARTIFICIAL INTELLIGENCE

CROSS-REFERENCE TO RELATED APPLICATIONS

This application is a continuation of U.S. application Ser. No. 17/845,249, titled "SYSTEMS AND METHODS FOR CATEGORIZING DOMAINS USING ARTIFICIAL INTELLIGENCE", and filed on Jun. 21, 2022.

BACKGROUND

Accurately categorizing webpages or domains is important for a variety of applications. For example, a user may desire to categorize domains for use by a search engine or other index. As another example, a user may wish to prevent workers or family members from accessing webpages associated with pornography, gambling, or other controversial categories.

While categorizing webpages and domains is useful, it is also extremely time consuming and labor intensive. Generally, human reviewers review each webpage of a domain, and may assign one or more categories to each domain based on their review. However, such human review is error prone and time consuming. Moreover, given the huge number of new domains created every day, manually categorizing each new domain is impractical.

SUMMARY

In an embodiment, a set of labeled training data that includes indicators of webpages is received. Each indicated webpage is labeled with one or more categories that were determined for the webpage by a human reviewer. Features, such as text and scripts, are extracted from each indicated webpage, and are used along with the labels to train a classifier to predict one or more categories for a webpage based on the features of the webpage. The trained classifier may be used to associate one or more categories with each domain of a plurality of domains given the categories predicted for some or all of the webpages associated with the domain. A list of domains and associated categories may be used for a variety of purposes including search engine optimization and content filtering. When a new domain is created, the trained classifier may be used to quickly and automatically associate one or more categories with the new domain, and the new domain and categories can be added to the list of domains and associated categories.

In an embodiment, a method for training a classifier is provided. The method includes: receiving a training set of webpages by a computing device, wherein each webpage in the training set is associated with one or more categories of a first plurality of categories; for each webpage of the training set of webpages, extracting one or more features from the webpage by the computing device; and for each webpage of the training set of webpages, training a classifier using the one or more extracted features and the one or more categories associated with the webpage by the computing device. Embodiments may include some or all of the following features. The method may further include: reducing the first plurality of categories to a second plurality of categories; and associating each webpage of the set of webpages with one or more categories of the second plurality of categories based on the one or more categories of the first plurality of categories that are associated with each webpage. The one or more features may include text features and script features. The method may further include: for each domain of a plurality of domains: retrieving a set of webpages from the domain by the computing device; for each webpage of the set of webpages: extracting one or more features from the webpage of the set of webpages by the computing device; and associating one or more categories of the first plurality of categories with the webpage using the classifier and the one or more features extracted from the webpage by the computing device. The method may further include for each domain of the plurality of domains, associating one or more categories of the first plurality of categories with the domain based on the one or more categories associated with each webpage of the set of webpages from the domain. Associating one or more categories of the first plurality of categories with the domain based on the one or more categories associated with each webpage of the set of webpages from the domain may include: determining each category associated with more than a threshold percentage of webpages of the set of webpages; and associating the determined categories with the domain. Each category is associated with a different threshold percentage.

In an embodiment, a method for associating categories with domains is provided. The method includes: receiving a list of domains by a computing device; receiving a plurality of categories by the computing device; receiving a classifier by the computing device; for each domain of the list of domains: retrieving a set of webpages from the domain by the computing device; for each webpage of the set of webpages: extracting one or more features from the webpage of the set of webpages by the computing device; associating one or more categories of the plurality of categories with the webpage using the classifier and the one or more features extracted from the webpage by the computing device; and associating one or more categories of the plurality of categories with the domain based on the one or more categories associated with each webpage of the set of webpages from the domain by the computing device.

Embodiments may have some or all of the following features. The one or more features may include text features and script features. The classifier is a neural network. Associating one or more categories of the plurality of categories with the domain based on the one or more categories associated with each webpage of the set of webpages from the domain may include: determining each category associated with more than a threshold percentage of webpages of the set of webpages; and associating the determined categories with the domain. Each category may be associated with a different threshold percentage. The method may further include: receiving indications of a training set of webpages by the computing device, wherein each webpage in the training set is associated with one or more categories of the plurality of categories; for each webpage of the training set of webpages, extracting one or more features from the webpage by the computing device; and for each webpage of the training set of webpages, training the classifier using the one or more extracted features and the one or more categories associated with the webpage by the computing device. The method may further include using the list of domains and associated one or more categories to control user access to the set of webpages associated with each domain of the list of domains.

A method for categorizing new domains using artificial intelligence is provided. The method includes: receiving a list of domains by the computing device, wherein each domain in the list of domains was associated with a category of the plurality of categories by a classifier; receiving an indication of a new domain by the computing device, wherein the new domain is not in the list of domains; in response to the indication, retrieving at least one webpage from the new domain by the computing device; extracting one or more features from the at least one webpage by the computing device; associating a category of the plurality of categories with the new domain using the classifier and the extracted one or more features by the computing device; and adding the new domain and the associated category to the list of domains by the computing device.

Embodiments may include some or all of the following features. The plurality of features may include text features and script features. The classifier may be a neural network. Associating the category of the plurality of categories with the new domain using the classifier and the extracted one or more features may include: determining the category associated with the at least one webpage using the extracted one or more features and the classifier; and associating the determined category with the domain. The method may further include: receiving indications of a training set of webpages by the computing device, wherein each webpage in the training set is associated with one or more categories of the plurality of categories; for each webpage of the training set of webpages, extracting one or more features from the webpage by the computing device; and for each webpage of the training set of webpages, training the classifier using the one or more extracted features and the one or more categories associated with the webpage by the computing device. The method may further include using the list of domains and associated one or more categories to control user access to webpages associated with the domains in the list of domains. The method may further include: receiving one or more access rules; and controlling user access to the webpages associated with the domains in the list of domains according to the received one or more access rules.

The embodiments described herein provide many benefits over the prior art. First, by categorizing domains using a trained classifier, the need for expensive human classifiers is greatly reduced. Second, because the trained classifier can quickly categorize new domains without human input, any application that relies on such categorized domains will be more current than applications that use traditional human-based methods for domain categorization.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate a domain categorization system and method. Together with the description, the figures further serve to explain the principles of the domain categorization system and method described herein and thereby enable a person skilled in the pertinent art to make and use the domain categorization system and method.

DETAILED DESCRIPTION

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

As described above, many organizations categorize domains. These categorized domains may be used for a variety of purposes such as search engine creation and access control. However, currently most entities rely on human reviewers to review and categorize domains, which given the large number of existing domains, and the large number of new domains that are created every day, categorizing domains is difficult and time consuming.

As will be described below in greater detail, to solve the problems noted above for categorizing domains, an artificial-intelligence-based classifier is trained to quickly and efficiently categorize domains based on one or more webpages associated with a domain. Initially, human reviewers are used to categorize a set of webpages extracted from a variety of domains. Features from the webpages and their associated categories are used to train the classifier. Later, when an entity wants to determine a category for an existing or new domain, some number of webpages are extracted from the domain and the classifier is used to categorize each extracted webpage without human reviewers. Some or all of the categories determined for the extracted webpages are then associated with the domain. In this way, new and existing domains can be quickly and efficiently categorized without the cost and time associated with human reviewers.

Figure 1:
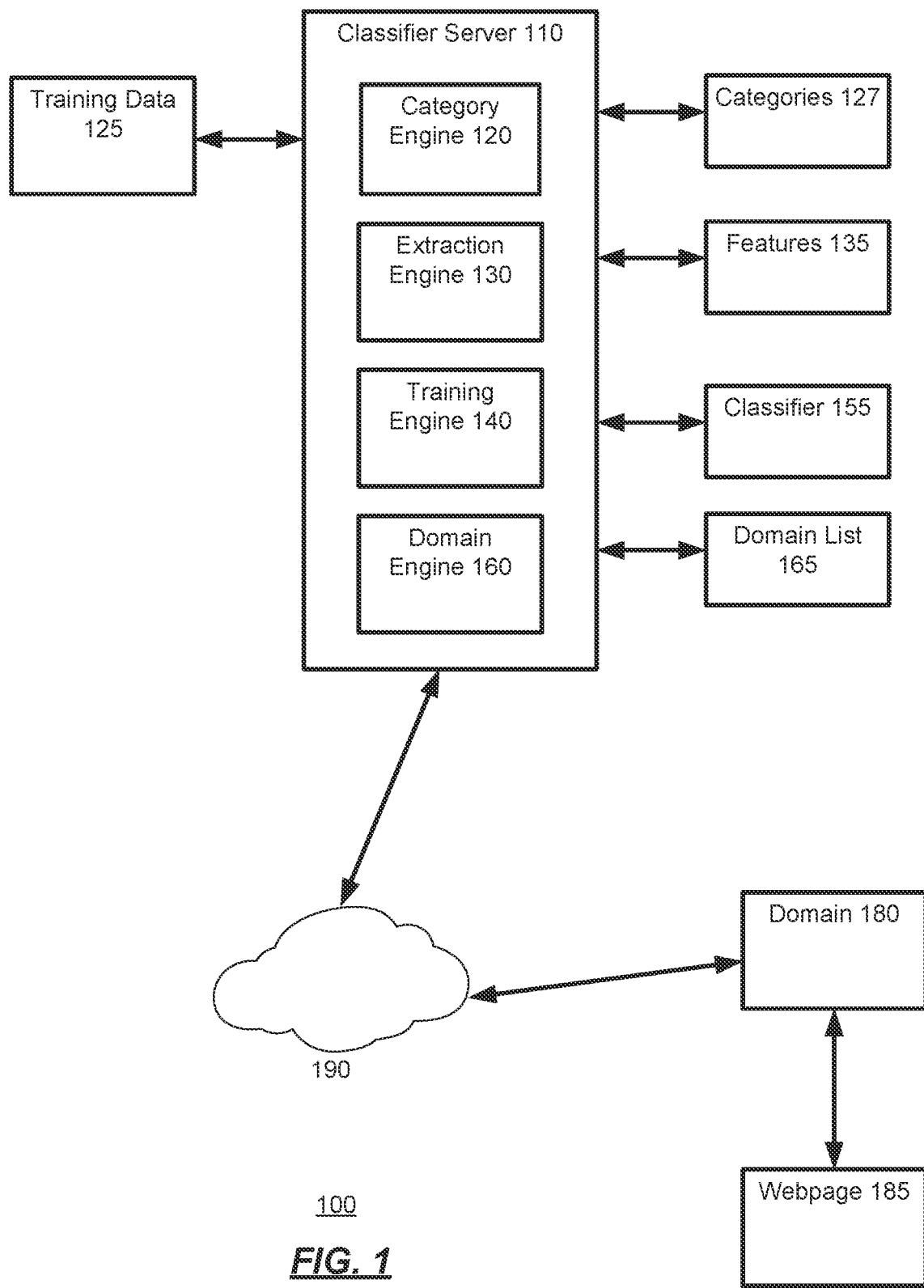
FIG. 1 is an example computing environment for training a classifier and for assigning categories to domains using the classifier.

FIG. 1 is an example of a cloud computing environment 100 for assigning categories to domains using a classifier. As shown, the environment 100 includes a classifier server 110 in communication with one or more domains 180 through a network 190. The network 190 may include a combination of public and private networks. Each of the classifier server 110 and domains 180 may be implemented using one or more general purpose computing devices such as the computing device 800 illustrated with respect to FIG. 8. Moreover, in some embodiments, the classifier server 110 may be implemented in a cloud-based computing environment.

A domain 180 may represent a group of webpages 185 reachable in part using a common domain name. For example, a domain 180 "foobaz.com" may include multiple webpages 185 such as "foobaz.com/home.html", "foobaz.com/contact.html" and "foobaz.com/FAQ.com". Each of the webpages 185 is reachable through the internet using a URL that includes the domain name "foobaz.com".

In order to control access to webpages 185, the classifier server 110 may generate what is referenced to as a domain list 165. The domain list 165 may be a list of domains 180 along with associated categories 127. A category 127 may be a topic or subject that is commonly associated with the webpages 185 of the domain 180. Example categories 127 may include controversial topics such as "pornography", "gambling", or "violence" and more general topics such as "news", "sports", and "music." Generally, the categories 127 may relate to topics or subjects that an entity, such as a corporation or a family, would like to prevent or restrict associated users from viewing or accessing. The particular categories 127 considered by the classifier server 110 may be selected by a user or administrator.

As shown, to create the domain list 165, the classifier server 110 includes several components including, but not limited to, a category engine 120, an extraction engine 130, a training engine 140, and a domain engine 160. More or fewer components may be supported. Each of the components may be implemented together or separately using one or more general purpose computing devices such as the computing device 800 illustrated with respect to FIG. 8.

The classifier server 110 may receive training data 125. The training data 125 may be labeled and may include identifiers of webpages 185, and each identified webpage 185 may be labeled with one or more categories. Depending on the embodiment, each identified webpage 185 may have been labeled with a category by a human reviewer.

The category engine 120 may receive the categories 127 that will be used in the domain list 165 and may optionally adjust or simplify the labels used in the training data 125 to conform to the received categories 127. For example, the received training data 125 may be labeled with gambling related categories such as "casino gambling" and "sports betting." However, the categories 127 may only include a single category 127 for all gambling related categories 127. Accordingly, the category engine 120 may replace all gambling related labels in the training data 125 with the category 127 of "gambling."

The extraction engine 130 may extract features 135 from some or all of the webpages 185 identified in the training data 125. The extracted features 135 may include text features and script features. With respect to text features, these features may include words and phrases, as well as certain combinations or words and phrases, which appear in a webpage 185. With regards to script features, these features may include all or portions of scripts, such as JavaScript scripts, which are found in a webpage 185. Other types of features 135 that may be extracted include image and video features. Any method for extracting features 135 from a webpage 185 may be used.

The training engine 140 may use some or all of the extracted features 135 for each identified webpage 185 in the training data 125, along with the associated category labels, to train a classifier 155. The classifier 155 may be an artificial intelligence classifier 155 or model that receives as an input features 135 extracted from a webpage 185, and outputs one or more categories 127 that are likely to be associated with the webpage 185. The classifier 155 may be a convolutional neural network. However, other types of classifiers and/or neural networks may be used such as shallow neural networks, deep neural networks, and recurrent neural networks. Depending on the embodiment, the training engine 140 may train the classifier 155 using a first portion of the training data 125, and then may test the classifier 155 using a second portion of the training data 125.

The domain engine 160 may use the classifier 155 to generate the domain list 165. In some embodiments, the domain engine 160 may generate the domain list 165, by first receiving a set of domains 180. The domain engine 160 may then, for each domain 180, use a crawler or other application, to retrieve some or all of the webpages 185 associated with the domain 180.

The domain engine 160 may then use the extraction engine 130 to extract features 135 from each of the webpages 185 associated with the domain 180 and may use the classifier 155 to determine or predict one or more categories 127 for each webpage 185 associated with the domain 180. Depending on the embodiment, the domain engine 160 may associate each domain 180 with the most frequent or top categories 127 predicted by the classifier 155 for the webpages 185 associated with the domain 180. These domains 180 and associated categories 127 may be used by the domain engine 160 to create the domain list 165.

In some embodiments, the domain engine 160 may associate a domain 180 with a category 127 when the category 127 is predicted for a threshold percentage of the webpages 185 associated with the domain 180 by the classifier 155. The threshold percentage may be specified by an administrator.

In some embodiments, the same threshold percentage may be used for all categories. In other embodiments, different threshold percentages may be used for different categories. For example, some controversial categories 127 such as "pornography" may have a lower threshold percentage than benign categories 127 such as "art" or "music".

As may be appreciated, new domains 180 are constantly being created. Accordingly, the domain engine 160 may be configured to determine new domains 180, determine one or more categories 127 for the new domains 180 as described above, and to add the new domains 180 and determined one or more categories 127 to the domain list 165. Depending on the embodiment, the domain engine 160 may determine new domains 180 from the WHOIS domains database. Other sources of newly added domains 180 may be used.

Because there may be a delay in registering a domain 180 and publishing one or more webpages 185 under the domain 180, in some embodiments, the domain engine 160 may wait to assign categories 127 to new domains 180 until some threshold number of webpages 185 are published. The threshold number of webpages 185 may be set by an administrator.

Figure 2:
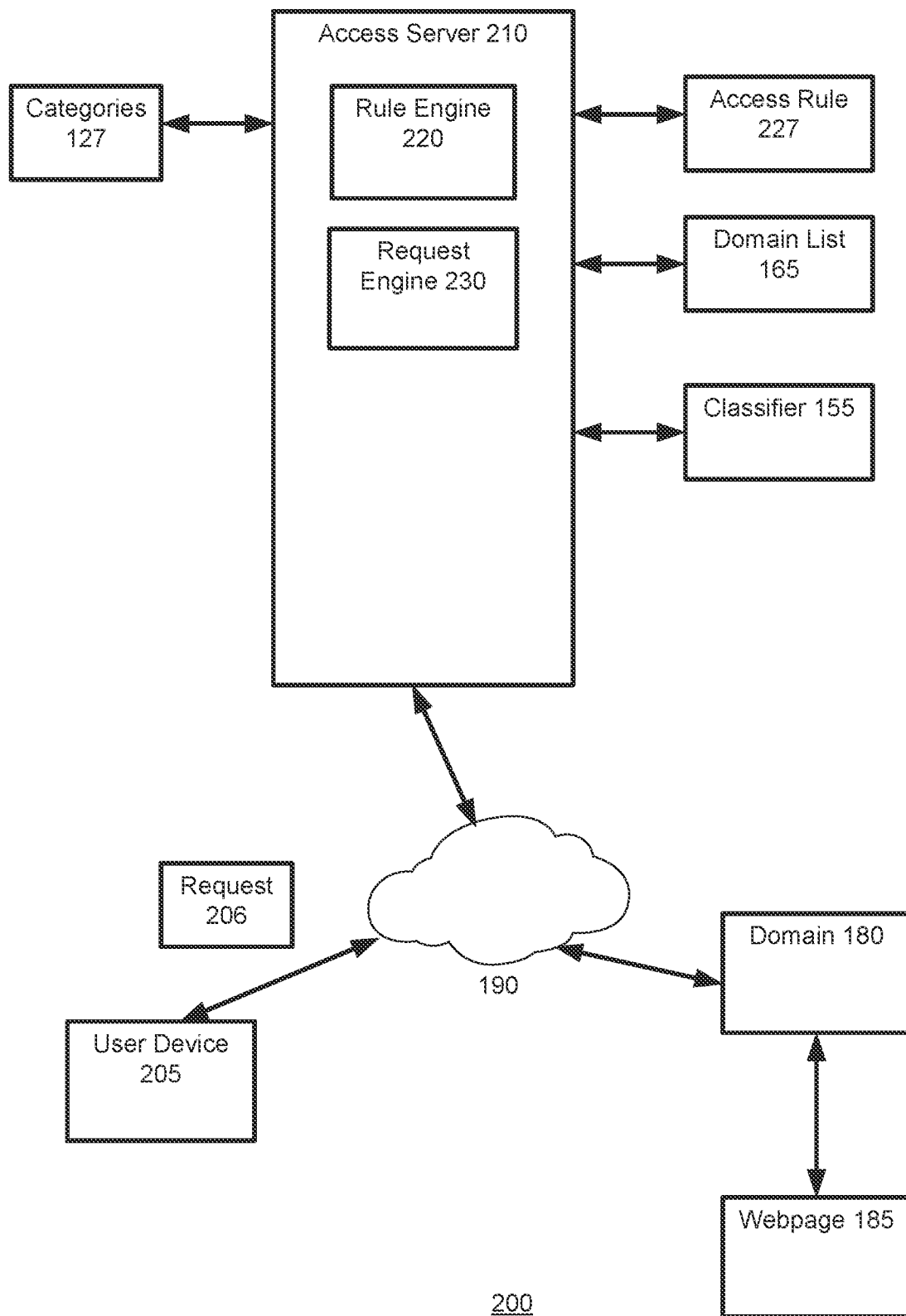
FIG. 2 is an example computing environment for controlling access to webpages and domains using access rules and a list of domains and categories.

FIG. 2 is an example computing environment 200 for controlling access to webpages and domains using access rules and a domain list. As shown, the environment 200 includes an access server 210 in communication with one or more domains 180 and user devices 205 through the network 190. Each of the access server 210, domain 180, and user device 205 may be implemented using one or more general purpose computing devices such as the computing device 800 illustrated with respect to FIG. 8.

The access server 210 may control access to one or more webpages 185 for user devices 205 based on the domain list 165 described previously with respect to FIG. 1 and one or more access rules 227. As shown the access server 210 may include several components including, but not limited to, a rule engine 220 and a request engine 230. More or fewer components may be supported.

The rule engine 220 may allow for the creation of one or more access rules 227 that control what webpages 185 and/or domains 180 that a user is allowed to access. As used herein an access rule 227 lists one or more categories 127 that a user is not allowed to view or visit using a corresponding user device 205. For example, an access rule 227 that includes the category 127 "video games" may indicate that a corresponding user is not allowed to visit webpages 185 that are associated with domains 180 that are associated with the category 127 "video games." Alternatively, an access rule 227 may list the categories 127 that the user is allowed to view or visit, and all other categories 127 may be restricted for the user.

In some embodiments, the access rules 227 may apply at all times, or may apply only at certain times. For example, an access rule 227 for a user may prevent the user from viewing webpages 185 that are associated with domains 180 of the category 127 "social networking" between the working hours of 9 am and 5 pm.

The rule engine 220 may provide a user interface through which administrators may create access rules 227 that apply to users associated with a particular entity such as a corporation or a family. The administrators may select the particular categories 127 for each access rule 227, as well as the particular users that the access rule 227 will apply to. Depending on the embodiment, the access rules 227 may apply to individual users, or groups of users. For example, an administrator of a company may wish to restrict access to domains 180 associated with the category "pornography" to all users of the company. As another example, an administrator of a home or family network may wish to restrict access by child users to certain categories 127 but not adult users.

The request engine 230 may receive requests 206 for webpages 185 from user devices 205 and may either allow or deny the request 206 based on the particular access rules 227 that apply to the user associated with the user device 205. In some embodiments, the request 206 may be a Domain Name System (DNS) request made by the user device 205 in response to a user entering or selecting a URL using a browser application. When a user enters a URL that includes a domain name, the browser application of the user device 205 must first perform a domain name lookup where an IP address corresponding to the domain name of the URL is determined and can be used to request a webpage 185 using the IP address.

The request engine 230 (and access server 210) may function together with a DNS server that receives requests 206 from user devices 205. When a request 206 is received from a user device 205, the request engine 230 may first determine any access rules 227 that apply to the user of the user device 205 (either individually or as a group) and may determine any forbidden categories 127 that the user is not permitted to access. The request engine 230 may then use the domain list 165 to determine if the domain 180 associated with the request 205 is associated with any of the forbidden categories 127. If the request 206 is not associated with any of the forbidden categories 127, then the request engine 230 may pass the request 206 to a DNS server for further processing.

If the request 206 is associated with any of the forbidden categories 127, then the request engine 230 may either block the request 206 and may optionally redirect the user device 205 to a webpage explaining why the request 206 was blocked.

In some embodiments, the request engine 230 may receive a request 206 from a user that is not associated with an access rule 227. In such cases the request engine 230 may pass the request 206 to a DNS server for further processing.

As may be appreciated, because of the large number new domains 180 that are created every day, the request engine 230 may receive a request 206 for a webpage 185 associated with a domain 180 that is not in the domain list 165. In some embodiments, when a request 206 for a webpage 185 associated with a domain 180 that is not in the domain list 165 is received, the request engine 206 may assume that the domain 180 is "safe" and may pass the request to a DNS server for further processing.

Alternatively, in some embodiments, when a request 206 for a webpage 185 associated with a domain 180 that is not in the domain list 165 is received, the request engine 230 may retrieve the webpage 185 associated with the request 206, may extract the features 135 from the webpage 185, and may use the classifier 155 and the extracted features 135 to predict one or more categories 127 for the webpage 185. If any of the predicted one or more categories 127 are forbidden categories 127 for the user, the request 206 may be denied as described above.

Figure 3:
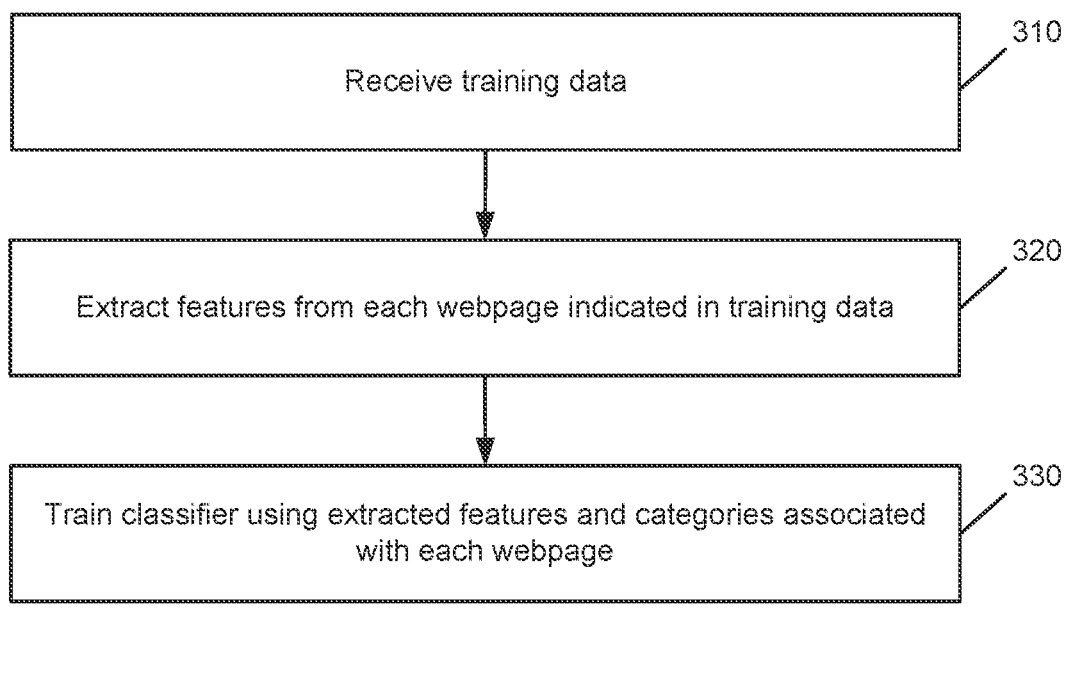
FIG. 3 is an illustration of an example method for training a classifier to determine one or more categories for webpages.

FIG. 3 is an illustration of an example method 300 for training a classifier to determine one or more categories for webpages. The method 300 may be implemented by the training engine 140 of the classifier server 110.

At 310, training data is received. The training data 125 may be received by the training engine 140 of the classifier server 110. The training data 125 may be labeled and may include a set of indications of webpages 185. Each indicated webpage 185 in the training set may be labeled with one or more categories 127.

At 320, features are extracted from each webpage indicated in the training data. The features 125 may be extracted from each webpage 185 indicated in the training data 125 by the extraction engine 130. The extracted features 135 may include text features and script features. Other types of features 135 may be extracted.

At 330, a classifier is trained using the extracted features and categories associated with each webpage. The classifier 155 may be trained by the training engine 140. The classifier 155 may receive as an input features 135 extracted from a webpage 185 and may output one or more categories 127.

Figure 4:
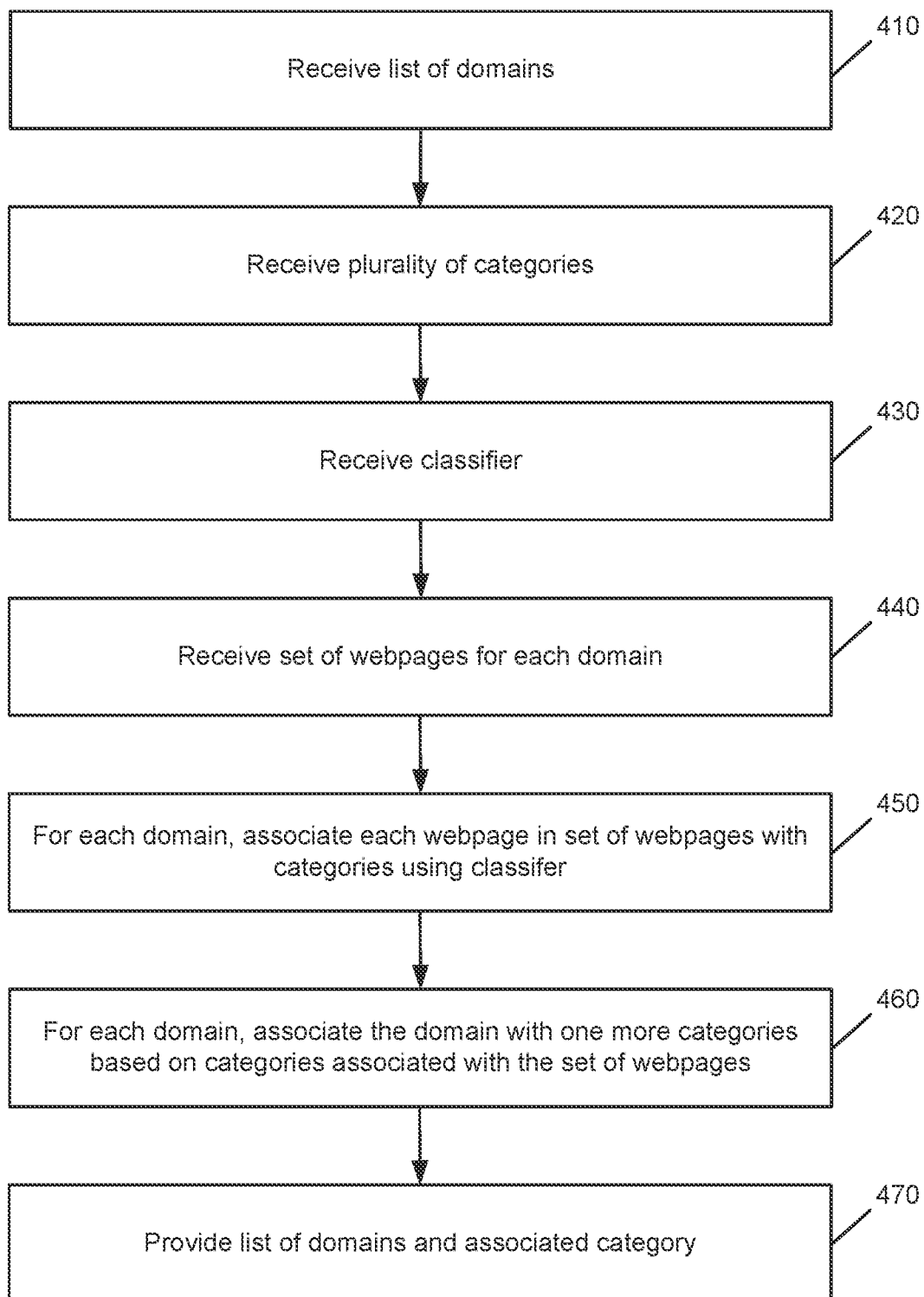
FIG. 4 is an illustration of an example method for associating categories with domains.

FIG. 4 is an illustration of an example method 400 for associating categories with domains. The method 400 may be implemented by the domain engine 160 of the classifier server 110.

At 410, a list of domains is received. The list of domains may be received by the domain engine 160. The list of domains 180 may include some or all of the domains 180 available on the internet, for example.

At 420, a plurality of categories is received. The plurality of categories 127 may be received by the domain engine 160 from the category engine 120. The categories 127 may be selected topics or subjects of webpages 185 and/or domains 180 that one or more entities may desire to restrict or prevent access to for their users or employees.

At 430, a classifier is received. The classifier 155 may be received by the domain engine 160 from the training engine 140. The classifier 155 may be a convolutional neural network trained to predict one or more categories 127 for a webpage 185 based on features 135 extracted from the webpage 185.

At 440, a set of webpages is received for each domain. The set of webpages 185 for a domain 180 may be webpages 185 that are part of the domain 180 and may be retrieved by the domain engine 160. In some embodiments, the domain engine 160 may use a web crawler or other software tool to retrieve some or all of the webpages 185 available on a domain 180. Alternatively, the domain engine 160 may select a random subset of the webpages 185 that are available at a domain 180 or may select the most popular webpages 185.

At 450, for each domain, each webpage in the set of webpages is associated with one or more categories. Each webpage 185 may be associated with one or more categories 127 by the domain engine 160 using the classifier 155. Depending on the embodiment, the one or more categories 127 may be associated with a webpage 185, by extracting features 135 from the webpage 185 and using the classifier 155 to predict one or more categories for the webpage 185 based on the features 135.

At 460, for each domain, the domain is associated with one or more categories based on the categories associated with the webpages of the set of webpages. Each domain 180 may be associated with one or more categories 127 by the domain engine 160. In some embodiments, a domain 180 may be associated with a category 127 when a threshold percentage of the webpages 185 of the set of webpages 185 associated with the domain 180 were associated with the category 127 by the classifier 155. The percentage may be set by a user or administrator.

At 470, the list of domains and associated categories is provided. The list or domains and associated categories may be provided by the domain engine 160 to the access server 210 for use in enforcing one or more access rules 227, for example.

Figure 5:
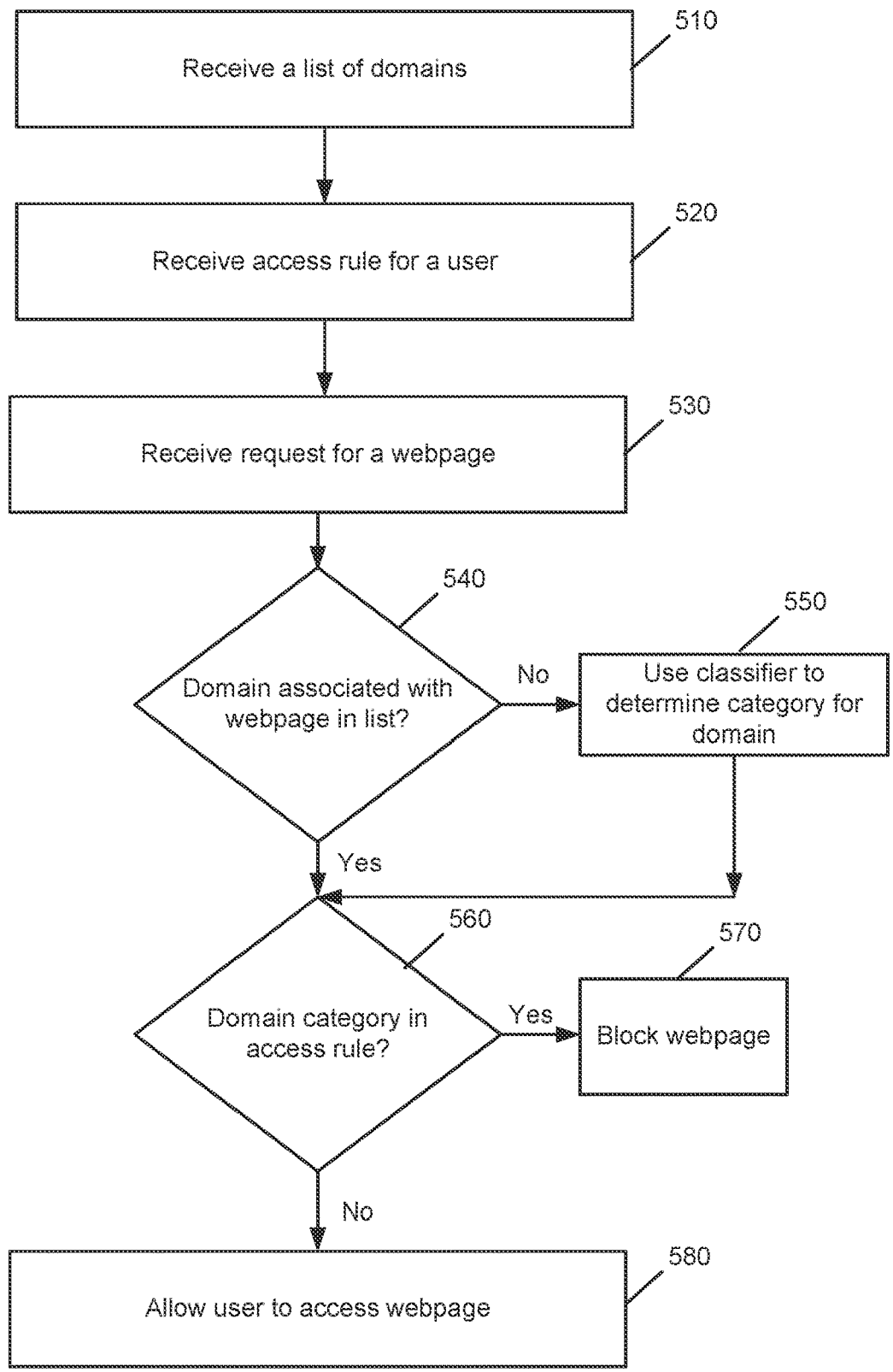
FIG. 5 is an illustration of an example method for controlling access to webpages for a user using access rules and domain categories.

FIG. 5 is an illustration of an example method 500 for controlling access to webpages using access rules and domain categories. The method 500 may be implemented by the access server 210.

At 510, a list of domains is received. The list of domains may be the domain list 165 and may associate each domain 180 in the list with one or more categories 127. The domain list 165 may be received from the classifier server 110.

At 520, an access rule for a user is received. The access rule 227 may be received by the request engine 230 from the rule engine 220. The access rule 227 may include one or more categories 127 of webpages 185 that the user is forbidden from accessing. The access rule 227 may apply to individual users or groups of users.

At 530, a request for a webpage is received. The request 206 may be received by the request engine 230 from a user device 205 associated with the user. The request 206 may be part of a DNS request related to the domain 180 associated with the requested webpage 185.

At 540, whether the domain associated with the webpage is in the list of domains is determined. The determination may be made by the request engine 230 searching the domain list 165. If the domain 180 is not in the domain list 165, the method 500 may continue at 550. Else, the method 500 may continue at 560.

At 550, the classifier is used to determine a category for the domain associated with the request. The category 227 may be determined by the request engine 230 using the classifier 155. In some embodiments, the request engine 230 may extract features 135 from the requested webpage 185 and may use the extracted features 135 and the classifier 155 to predict one or more categories for the requested webpage 185. The determined one more category 127 may be used for the domain 180. Alternatively, multiple webpages 185 associated with the domain 180 may be retrieved and the categories 127 predicted for these webpages 185 may be used to determine the one or more categories for the domain 180. Depending on the embodiment, after determining the one or more categories 127 for the domain 180 the request engine 230 may update the domain list 165.

At 560, whether the category of the domain is in the access rule is determined. The determination may be made by the request engine 230. If the domain 180 of the requested webpage 185 is in the access rule 227, then the method 500 may continue at 570. Else, the method 500 may continue at 580.

At 570, the webpage is blocked. The requested webpage 185 may be blocked by the request engine 230. In some embodiments, the request engine 230 may block the requested webpage 185 by redirecting the user device 205 to a different webpage 185 that explains why the requested webpage 185 was blocked. The different webpage 185 may indicate the blocked categories 127 that were associated with the domain 180 and may include contact information for a user or administrator. The request engine 230 may redirect the request 206 by sending the user device 205 an IP address associated with the different webpage 185 in response to the DNS request.

At 580, the user is allowed to access the requested webpage. The user may be allowed to access the requested webpage 185 by the request engine 230. The request engine 230 may pass the request 206 to a DNS server for fulfilment.

Figure 6:
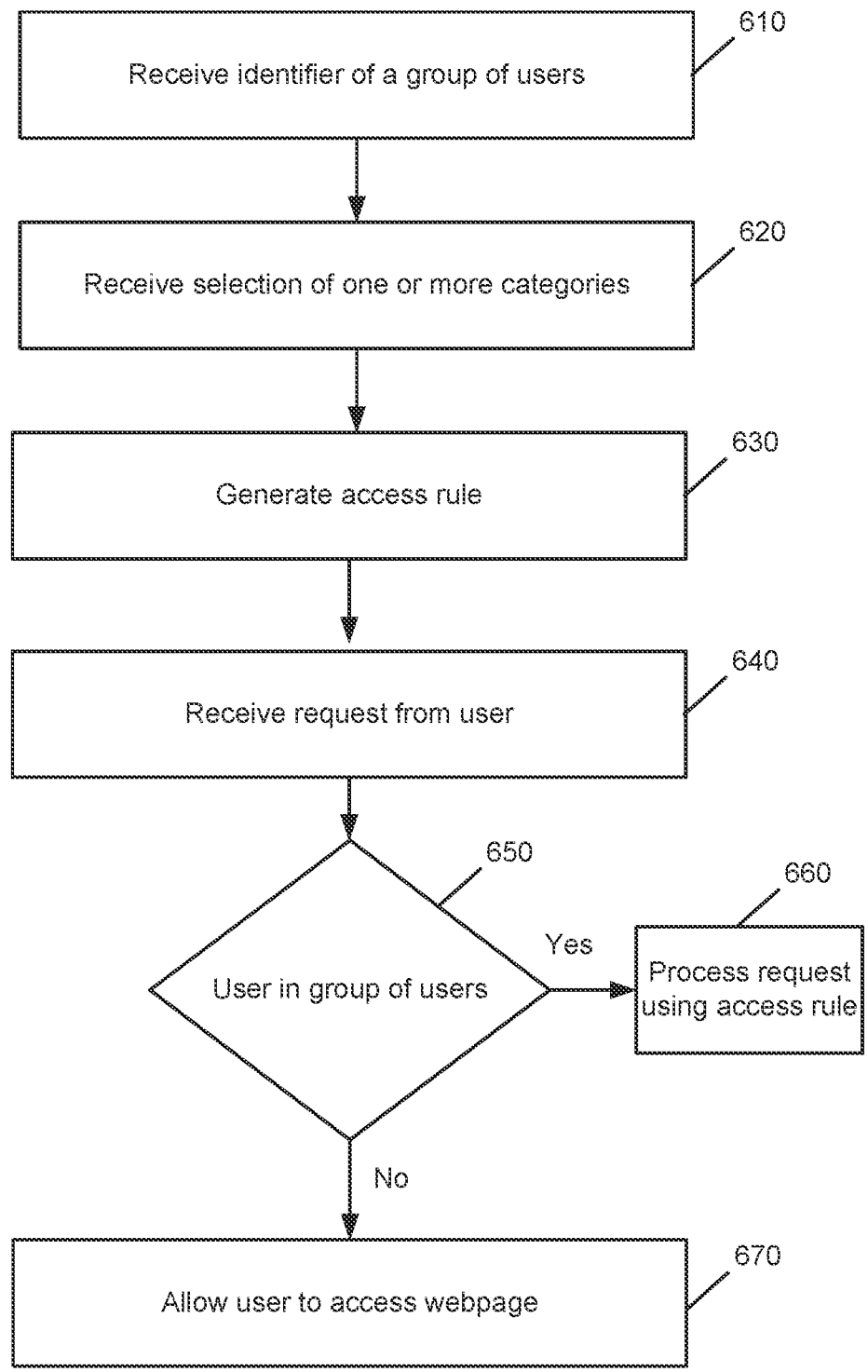
FIG. 6 is an illustration of an example method for controlling access for groups of users to webpages using access rules and domain categories.

FIG. 6 is an illustration of an example method 600 for controlling access to webpages using access rules and domain categories. The method 600 may be implemented by the access server 230.

At 610, an identifier of a group of users is received. The identifier may be received by the rule engine 220. A user or administrator may desire to create an access rule 227 for the users in the group and may connect to the rule engine 220 using a user interface provided by the rule engine 220 or access server 210.

At 620, a selection of one or more categories is received. The selection of the one or more categories may be received by the rule engine 220 from the user or administrator creating the access rule 227. The one or more categories 127 may be categories of domains 180 and/or webpages 185 that the user or administrator would like to prevent users in the group from viewing or accessing.

At 630, an access rule is generated. The access rule 227 may be generated by the rule engine 220 based on the identified group of users and the selected categories 127.

At 640, a request is received from a user. The request may be received from a user device 205 associated with the user by the request engine 230. The request 206 may be a DNS request and may be a request to access a webpage 185 associated with a domain 180.

At 650, whether the user associated with the request is in the identified group of users is determined. The determination may be made by the request engine 230. If the user is in the group of users, the method 600 may continue at 660. Else, the method 600 may continue at 670.

At 660, the request is processed using the access rule. The request 206 may be processed by the request engine 230 using the access rule 227 as described previously. In particular, the request engine 230 may only permit the user to view the requested webpage 185 if the domain 180 associated with the webpage 185 is not also associated with any category 127 indicated in the access rule 227.

At 670, the user is allowed to access the webpage 185. The user may be allowed to access the requested webpage 185 by the request engine 230. The request engine 230 may return the IP address associated with the domain 180 of the requested webpage 185 or may pass the request 206 to a DNS server for fulfilment.

Figure 7:
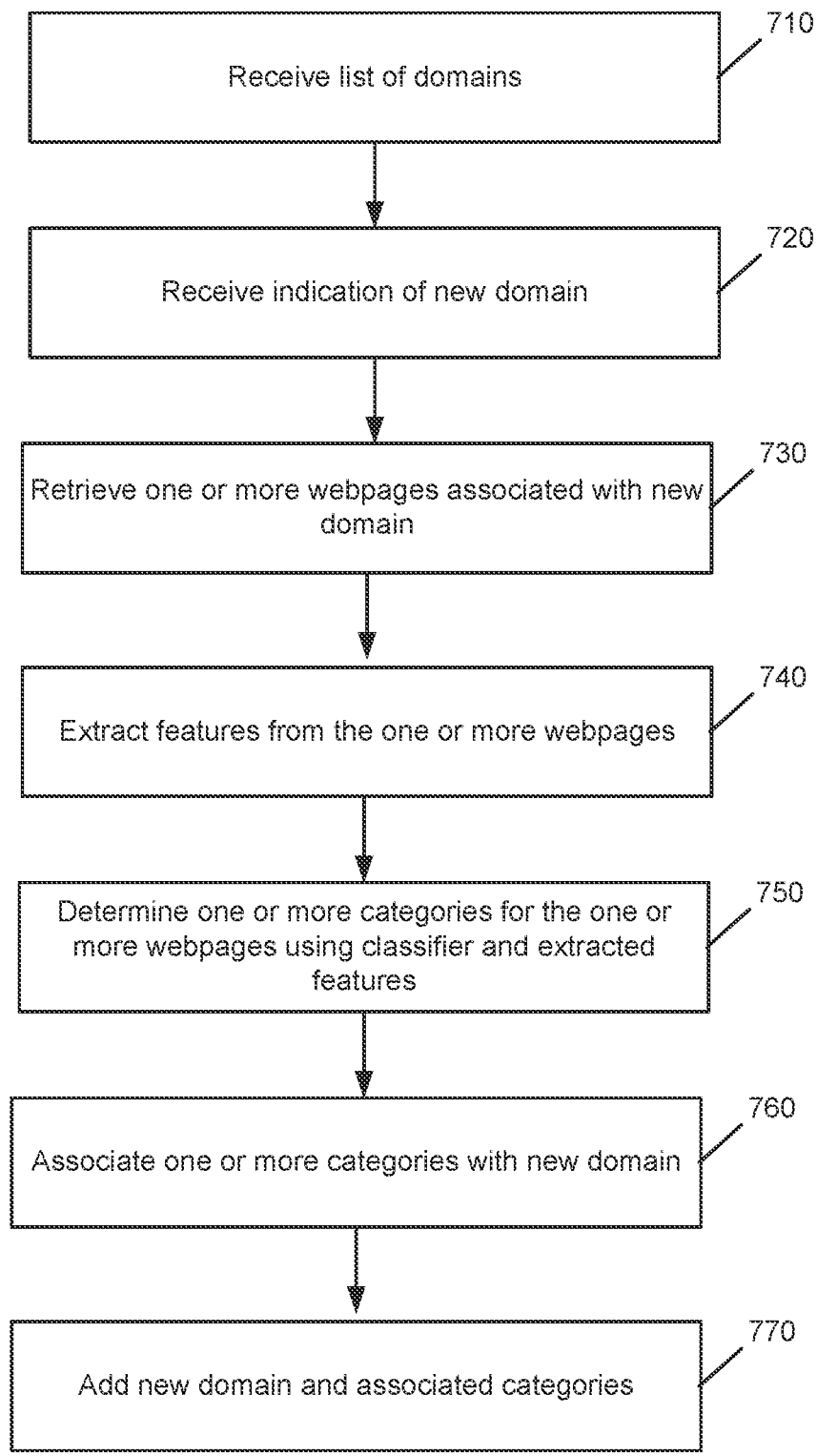
FIG. 7 is an illustration of an example method for associating categories with new domains.

FIG. 7 is an illustration of an example method 700 for associating categories with new domains. The method 700 may be implemented by the classifier server 110.

At 710, a list of domains is received. The list of domains may be the domain list 165 and may be received by the domain engine 160. The domain list 165 150 may include some or all of the domains 180 available on the internet at certain time. Each domain 180 in the list 165 may have one or more associated categories 127.

At 720, an indication of a new domain is received. The indication of a new domain 180 may be received by the domain engine 160. The indication of a new domain 180 may be received from a service or publication that lists all new domains 180 created on a subsequent day. The new domain 180 may be a domain 180 that is not in the domain list 165

At 730, one or more webpages associated with the new domain are retrieved. The one or more webpages 185 may be retrieved by the domain engine 160.

At 740, features are extracted from the one or more webpages. The features 135 may be extracted by the extraction engine 130 of the classifier server 110. The features 135 may include text features 135 and script features 135. Other features 135 may be supported At 750, one or more categories for the one or more webpages are determined. The one or more categories 127 for each of the one or more webpages 185 may be determined by the domain engine 160 using the classifier 155 and the features extracted from each of the one or more webpages.

At 760, one or more of categories are associated with the new domain. The one or more categories 127 may be associated with the new domain 180 by the domain engine 160. In some embodiments, the domain engine 160 may associate categories 127 with the new domain 180 that are associated with more than a threshold percentage of the one or more webpages 185.

At 770, the new domain and associated one or more categories are added. The new domain and associated one or more categories may be added to the domain list 165 by the domain engine 160.

Figure 8:
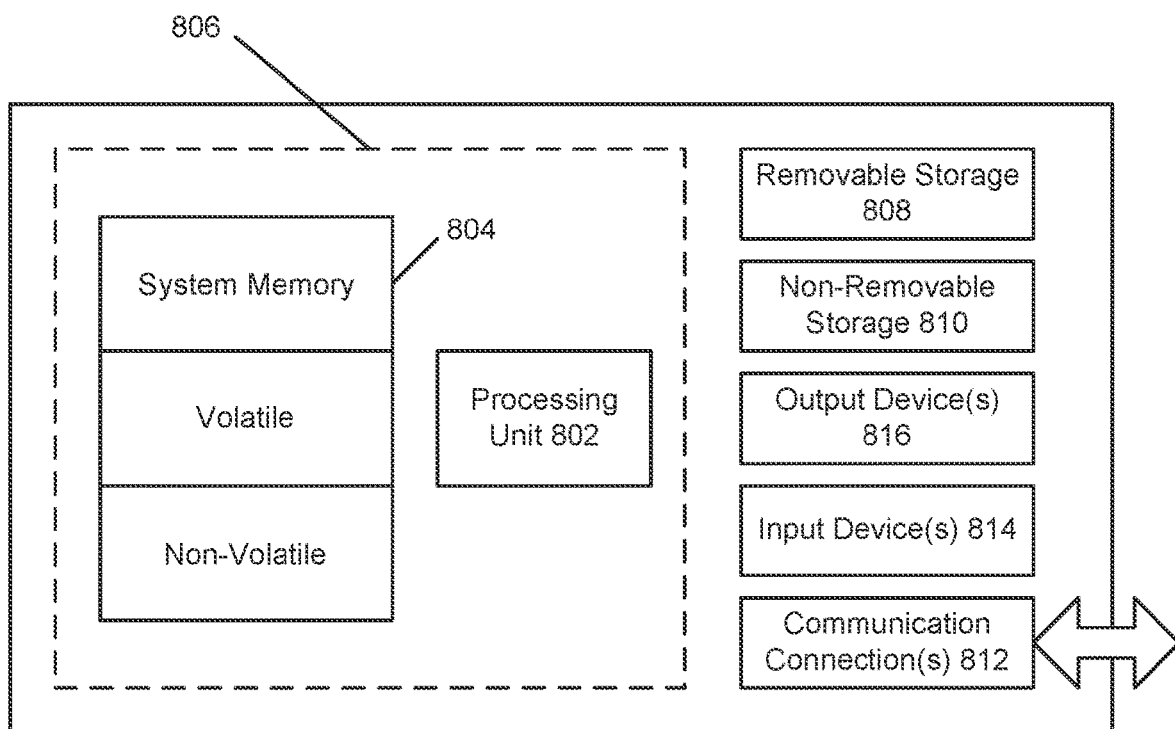
FIG. 8 shows an exemplary computing environment in which example embodiments and aspects may be implemented.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for associating categories with domains comprising:
    receiving a list of domains by a computing device, wherein each domain in the list of domains is associated with a set of webpages published at the domain;
    receiving a plurality of categories from an entity by the computing device, wherein each category of the plurality of categories comprises a topic that the entity desires to restrict access to for one or more users;
    receiving a classifier by the computing device;
    for each domain of the list of domains:
        retrieving the set of webpages published at the domain by the computing device;
        for each webpage of the set of webpages:
            extracting a plurality of features from the webpage of the set of webpages by the computing device, wherein the plurality of features comprise script features, and wherein the script features comprise portions of scripts found in the webpage of the set of webpages; and
            associating one or more categories of the plurality of categories with the webpage using the classifier and the plurality of features extracted from the webpage by the computing device; and
        for each category of the plurality of categories:
            determining the percentage of webpages of the set of webpages published at the domain that were associated with the category by the classifier;
            determining the threshold percentage set for the category, wherein each category was set with a different threshold percentage;
            determining that the percentage of webpages is greater than the threshold percentage for the category; and
            in response to determining that the percentage of webpages is greater than the threshold percentage for the category, associating the category with the domain.

2. The method of claim 1, wherein the plurality of features further comprise text features, image features, and video features.

3. The method of claim 1, further comprising:
    receiving an indication of the creation of a new domain, wherein the new domain is not in the list of domains;
    determining that a number of webpages published at the new domain exceeds a threshold number; and
    in response to the determination, adding the new domain to the list of domains.

4. The method of claim 1, further comprising:
    receiving indications of a training set of webpages by the computing device, wherein each webpage in the training set is associated with one or more categories of the plurality of categories;
    for each webpage of the training set of webpages, extracting one or more features from the webpage by the computing device; and
    for each webpage of the training set of webpages, training the classifier using the one or more extracted features and the one or more categories associated with the webpage by the computing device.

5. The method of claim 1, further comprising using the list of domains and associated one or more categories to control user access to the set of webpages associated with each domain of the list of domains.

6. A system for associating categories with domains comprising:
    at least one processor; and
    a computer-readable medium storing computer executable instructions stored therefore that when executed by the at least one processor cause the system to:
        receive a list of domains, wherein each domain in the list of domains is associated with a set of webpages published at the domain;
        receive a plurality of categories, wherein each category of the plurality of categories comprises a topic that an entity desires to restrict access to for one or more users;
        receive a classifier;
        for each domain of the list of domains:
            retrieve set of webpages published at the domain;
            for each webpage of the set of webpages:
                extract a plurality of features from the webpage of the set of webpages, wherein the plurality of features comprise script features, and wherein the script features comprise portions of scripts found in the webpage of the set of webpages; and
                associate one or more categories of the plurality of categories with the webpage using the classifier and the plurality of features extracted from the webpage; and
            for each category of the plurality of categories:
                determine the percentage of webpages of the set of webpages published at the domain that were associated with the category by the classifier;

determine the threshold percentage set for the category, wherein each category was set with a different threshold percentage;
determine that the percentage of webpages is greater than the threshold percentage for the category; and
in response to determining that the percentage of webpages is greater than the threshold percentage for the category, associate the category with the domain.

7. The system of claim 6, wherein the plurality of features further comprise text features, image features, and video features.

8. The system of claim 6, wherein the classifier is a neural network.

9. The system of claim 6, further comprising computer executable instructions stored therefore that when executed by the at least one processor cause the system to:
receive indications of a training set of webpages, wherein each webpage in the training set is associated with one or more categories of the plurality of categories;
for each webpage of the training set of webpages, extract one or more features from the webpage; and
for each webpage of the training set of webpages, train the classifier using the one or more extracted features and the one or more categories associated with the webpage.

10. The system of claim 6, further comprising computer executable instructions stored therefore that when executed by the at least one processor cause the system to use the list of domains and associated one or more categories to control user access to the set of webpages associated with each domain of the list of domains.

11. A non-transitory computer-readable medium storing computer executable instructions stored therefore that when executed by at least one processor cause the at least one processor to:
receive a list of domains, wherein each domain in the list of domains is associated with a set of webpages published at the domain;
receive a plurality of categories, wherein each category of the plurality of categories comprises a topic that an entity desires to restrict access to for one or more users;
receive a classifier;
for each domain of the list of domains:
retrieve the set of webpages published at the domain;
for each webpage of the set of webpages:
extract a plurality of features from the webpage of the set of webpages, wherein the plurality of features comprise script features, and wherein the script features comprise portions of scripts found in the webpage of the set of webpages; and
associate one or more categories of the plurality of categories with the webpage using the classifier and the plurality of features extracted from the webpage; and
for each category of the plurality of categories:
determine the percentage of webpages of the set of webpages published at the domain that were associated with the category by the classifier;
determine the threshold percentage set for the category, wherein each category was set with a different threshold percentage;
determine that the percentage of webpages is greater than the threshold percentage for the category; and
in response to determining that the percentage of webpages is greater than the threshold percentage for the category, associate the category with the domain.

12. The computer-readable medium of claim 11, wherein the features comprise text features, image features, and script features.

13. The computer-readable medium of claim 11, wherein the classifier is a neural network.

14. The computer-readable medium of claim 11, further comprising computer executable instructions stored therefore that when executed by the at least one processor cause the system to:
receive indications of a training set of webpages, wherein each webpage in the training set is associated with one or more categories of the plurality of categories;
for each webpage of the training set of webpages, extract one or more features from the webpage; and
for each webpage of the training set of webpages, train the classifier using the one or more extracted features and the one or more categories associated with the webpage.

* * * * *